United States Patent
Lafata et al.

(10) Patent No.: US 7,108,824 B1
(45) Date of Patent: Sep. 19, 2006

(54) METHOD AND APPARATUS FOR MOLDING PLASTIC MATERIALS WITH A METALLIC APPEARANCE

(75) Inventors: Paul S. Lafata, Chesterfield, MI (US); Jack W. Hise, Evart, MI (US)

(73) Assignee: Collins & Aikman Products Co., Southfield, MI (US)

( * ) Notice: Subject to any disclaimer, the term of this patent is extended or adjusted under 35 U.S.C. 154(b) by 0 days.

(21) Appl. No.: 10/089,558

(22) PCT Filed: Sep. 29, 2000

(86) PCT No.: PCT/US00/26901

§ 371 (c)(1),
(2), (4) Date: Nov. 18, 2002

(87) PCT Pub. No.: WO01/23156

PCT Pub. Date: Apr. 5, 2001

(51) Int. Cl.
*B29C 45/26* (2006.01)
(52) U.S. Cl. .................... 264/328.1; 425/191
(58) Field of Classification Search .......... 425/183, 425/190, 182, 191, 185; 264/39, 328.1, 297.2
See application file for complete search history.

(56) References Cited

U.S. PATENT DOCUMENTS

| | | | |
|---|---|---|---|
| 4,034,951 A | 7/1977 | Sokoloski | 249/102 |
| 4,157,148 A | 6/1979 | White | 222/346 |
| 4,399,093 A | 8/1983 | Kirby et al. | 264/328.2 |
| 4,828,769 A | 5/1989 | Maus et al. | 264/1 |
| 4,952,132 A | 8/1990 | Lundquist | 425/197 |
| 5,334,006 A | 8/1994 | Hepler et al. | 425/190 |
| 5,762,976 A | 6/1998 | Brown | 425/190 |
| 6,146,123 A | 11/2000 | Lausenhammer et al. | 425/130 |

FOREIGN PATENT DOCUMENTS

EP  0 875 354 A1  11/1998
JP  05 031767 A   2/1993

OTHER PUBLICATIONS

"Antec 1996 Plastics: Plastics—Racing into the Future, vol. 1: Processing: Effects of gate design on the processing latitudes of engineering thermoplastics", 1996 Society of Plastics Engineers; XP-002273645; p. 2, paragraph 1; p. 4, paragraph 6-8, figures 1-3.
Thienel P., et al; "Oberflachenfehler An Thermoplastischen Spritzgiessteilen, Teil 1"; Plastverarbeiter, Zechner Und Huethig Verlag GMBH. Speyer/Rhein, DE, vol. 46, No. 4, Apr. 1, 1995, pp. 92, 95-97, XP000510880 p. 95, paragraph 3; p. 96, paragraph 4.
Thienel P et al: "Oberflachenfehler An Thermoplastischen Spritzgiessteilen, Teil 2"; Plastverarbeiter, Zechner Und Huethig Verlag GMBH. Speyer/Rhein, DE, vol. 46, No. 5, May 1, 1995; pp. 24, 26-28; XP000504734; p. 26, paragraph 2; p. 27, paragraphs 3-4.
Wheeler, I.: "Metallic Pigments in Polymers"; Sep. 1, 1999, Rapra, London, XP002273646; pp. 89, paragraph 4, p. 92, paragraph 4; p. 93, paragraph 1-3; p. 127, paragraph 2.

*Primary Examiner*—Joseph S. Del Sole
*Assistant Examiner*—Emmanuel S. Luk
(74) *Attorney, Agent, or Firm*—Grossman, Tucker, Perreault & Pfleger, PLLC

(57) ABSTRACT

An apparatus and method for molding plastic materials is provided comprising a mold having a first mold section (12) and a second mold section (14) with a mold cavity (16) disposed in between. A first gate design is provided by at least one first gate design mold member (40), and a second gate design is provided by at least one second gate design mold member. The first and second gate design mold members are removably attachable to, and interchangeable on, at least one of the first or the second mold sections (12, 14) to change from the first gate design to the second gate design.

6 Claims, 2 Drawing Sheets

METHOD AND APPARATUS FOR MOLDING PLASTIC MATERIALS WITH A METALLIC APPEARANCE

FIELD OF THE INVENTION

The present invention relates to a method and apparatus for molding plastic materials with a metallic appearance and, more particularly, to an injection mold having interchangable gate inserts that supply molten thermoplastic material into a mold cavity.

BACKGROUND OF THE INVENTION

As used in this specification, a colorant is any material that can impart color to the medium in which it is used. The colorant may be insoluble or soluble in the medium. Generally, colorants may be divided into two broad categories; pigments and dyes. As used in this specification, a pigment may be organic or inorganic, natural or synthetic, and is generally insoluble in the medium in which it is used, while a dye is generally soluble in the medium in which it is used.

As used in this specification, a subcategory inclusive of pigments are pigments used to modify the optical characteristics of the medium in which they are used, such as light reflectivity, light refractivity, light absorbance, or light transmittance. A subcategory of pigments used to modify the optical characteristics of the medium in which they are used are light-reflective pigments. Light-reflective pigments include, but are not limited to, metallic pigments (also known as metallic-flake pigments) and glitter (also known as flitter or spangles). A metallic pigment is a particle or flake, generally of metal or alloy, used to modify the optical characteristics of the medium, such as reflectivity, or to achieve a metallic appearance. The metals most commonly used include, but are not limited to, gold, silver, aluminum, copper, bronze, and zinc. Materials other than metals which may be used to achieve a metallic appearance include minerals (e.g. mica) or glass. These materials generally are all used in flake form.

Typically, products molded from plastic materials include, but are not limited to, automotive body panels, fascias and claddings. In the automotive industry, a preferred method of forming such products is injection molding of a plastic material, preferably that of a thermoplastic composition. Injection molding is preferred over other plastic forming techniques given its combination of high volume production with relatively low cost materials.

After molding, or post-molding, often a metallic appearance is applied to such automotive products in the form of a coating. Typically, this metallic appearance is achieved via a painting operation via the use of a metallic paint. A metallic paint is a paint which incorporates the use of a metallic pigment defined above.

Recently, there has been a desire to eliminate the post-molding application of a metallic appearance, such as via metallic paint, to such automotive products. There has been a desire to incorporate the metallic appearance for such automotive products during the forming, or molding, of the product itself. The incorporation of the metallic appearance for such automotive products during the forming of the product is desired to reduce cost, and the emission of potentially harmful volatile organic compounds (VOCs) into the atmosphere common to the painting process.

More particularly, there is a desire to incorporate the metallic appearance for such automotive products into the composition used for forming, or molding, the automotive product itself. There has also been a desire that the composition of the automotive product comprise a plastic material, preferably a thermoplastic material. Furthermore, there also has been a desire to form the above preferred thermoplastic material by a molding process, and, more particularly, an injection molding process.

More recently, attempts have been made to incorporate a metallic appearance into automotive products via thermoplastic injection molding. It has been found, through experimentation, that an acceptable level of quality of the molded automotive product can be achieved with an injection molding process and thermoplastic compositional alterations. Such is demonstrated by the 1999 Jeep Grand Cherokee Laredo front fascia, rear fascia and claddings, manufactured using an injection molding process with Solvay Engineered Polymers' Sequel 1440 grade of thermoplastic olefin (TPO) composition.

However, it has also been found that injection molding process and compositional-alterations required to produce an acceptable level of quality may vary significantly with each particular thermoplastic composition employed. More specifically, it has been found that, when different metallic pigments are used to achieve various metallic appearances and/or colors, the injection molding process and compositional alterations required to produce an acceptable level of quality between compositions may vary significantly. It has also been found that, in some cases, that even altering the injection molding process and thermoplastic composition, within acceptable limits, still may not produce an acceptable level of quality. Typically, such products did not produce an acceptable level of quality due to the presence of a differing metallic appearance on different locations on the surface of the product. This differing metallic appearance most noticeably appears in areas of the surface occupied by weld lines versus those areas of the surface without weld lines. Weld lines (also known as knit lines, flow lines, or weld marks) in a molded plastic product mark the meeting of different plastic flow fronts within a mold. According to Whittington's Dictionary of Plastics, $3^{rd}$ Edition, the flow fronts may have cooled and skinned over before meeting, or had too little time in the molten state for interdiffusion of molecular segments across the interface.

As a result of the above difficulties, apparatus alterations, in addition to injection molding process and thermoplastic composition alterations, were the subject of experimentation. Specifically, apparatus alterations focused on alterations to the injection mold used for the injection molding process. More specifically, injection mold alterations focused on gate design, such as size, configuration, and location. In injection molding, the gate is the channel through which molten plastic flows from the runner into the mold cavity.

SUMMARY OF THE INVENTION

From experimentation, it was found that altering the injection mold gate design, in addition to altering the injection molding process and thermoplastic composition, produced an acceptable level of quality. In other words, gate design had an effect on controlling different plastic flow fronts and weld line formation within the mold cavity such that the metallic appearance across the surface of the part could be made more uniform as to produce an acceptable level of quality. However, having different injection mold gate designs for each thermoplastic composition could only be achieved by means of significant injection mold alterations requiring substantial time not suitable for high volume production. Alternatively, the requirement of injection mold alterations could be eliminated with the fabrication of a different injection mold for each thermoplastic composition. However, the cost of different injection molds for each thermoplastic composition is prohibitive given the size of automotive products. Consequently, what was needed was an injection molding process, and more particularly, an injection mold apparatus in the form of an injection mold, which would facilitate quick, inexpensive gate design alterations to facilitate high volume, low cost production of thermoplastic injection molded automotive products with a metallic appearance.

An apparatus for molding plastic materials is provided comprising a mold having a first mold section (12) and a second mold section (14) with a mold cavity (16) disposed in between. A first gate design is provided by at least one first gate design mold member (40), and a second gate design is provided by at least one second gate design mold member. Preferably, date design mold member (40) is defined by two interchangeable members 41 and 42. Also preferably, the first and second gate design mold members are removably attachable to, and interchangeable on, at least one of the first or the second mold sections (12, 14) to change from the first gate design to the second gate design. A method for molding plastic materials is also provided comprising providing a mold having a first mold section (12) and a second mold section (14) with a mold cavity (16) disposed in between; providing a first gate design; forming a product in the mold cavity (16) by providing a first plastic material through the first gate design; separating the first mold section (12) and the second mold section (14); removing the product from the mold cavity (16); changing from the first gate design to a second gate design; forming a product in the mold cavity (16) by providing a second plastic material through the second gate design. In the above manner, the formation of weld lines on the product may be controlled.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
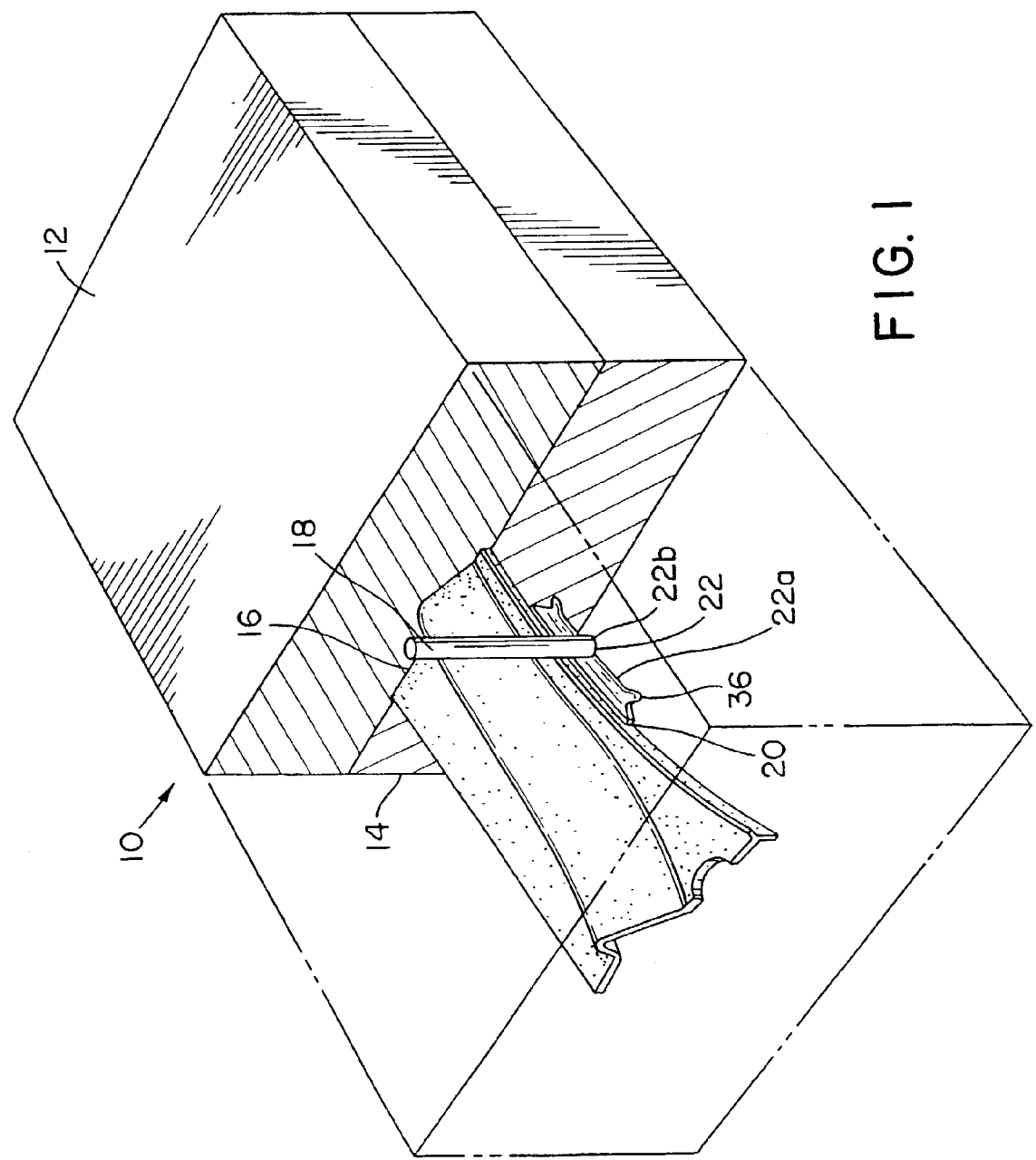
FIG. 1 is a perspective view of a mold apparatus and feed system with the mold and feed system partially cut away.

Referring to the Figures, wherein like numerals indicate like or corresponding parts throughout the several views, an injection molding apparatus is generally shown at 10. The injection molding apparatus 10 includes first and second mold sections 12, 14 defining a mold cavity 16. Also, a material feed system 18 includes an elongated gate portion 20 disposed along an edge of the mold cavity 16, the gate portion 20 being in fluid communication with the mold cavity 16. The feed system 18 also includes a runner portion 22 in direct fluid communication with the gate portion 20.

Now the invention will be described in greater detail. Preferably, the gate portion 20 and runner portion 22 are defined by two interchangeable members 41, 42 which are separable from the first and second mold sections 12, 14 and occupy recesses 50, 52 thereof in a fixed, but removable manner known in the art such as bolts, screws or the like (not shown). Although in other embodiments, the gate portion 20 and runner portion 22 may be defined by only one separate member (i.e. only one interchangeable member) of one of the mold sections 12, 14.

Starting at the most upstream point in the feed system 18 of mold sections 12, 14, the feed system first includes a drop 28. The drop 28 supplies the runner portion 22 with molten plastic material and, more particularly, a thermoplastic composition. Alternatively, the drop 28 may supply the gate portion 20 directly without the use of a runner portion 22. This discussion does not treat injection molding elements upstream of the drop 28 in mold sections 12,14. Such elements might include, for example, a hot-runner manifold and associated nozzles, etc. The exact manner in which molten material arrives to the gate portion 20 is not important to the present invention; and in any case various means for supplying molten plastic are well known to persons of skill in the art. Also, the term "feed system" encompasses numerous embodiments. The feed system 18 may include heating elements or even a hot-runner sub-system. Alternatively, the feed system 18 may simply include only a cold runner arrangement.

Figure 2:
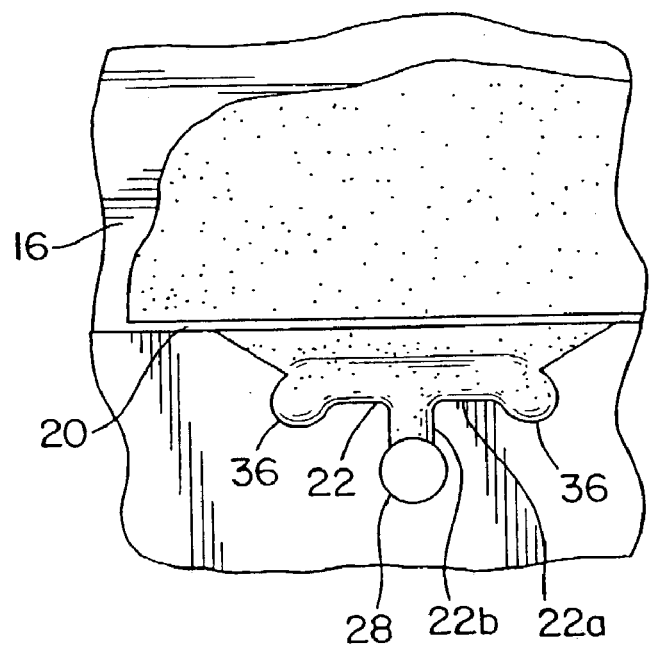
FIG. 2 is a top plan view of the molded article also showing the runner system and the gate.

Extending horizontally away from the drop 28 downstream of the drop is a runner portion 22. The runner portion 22 has two major sections, 22a and 22b. The second section 22b, connects with the drop 28 and carries molten material away from the drop 28 to first section 22a. The second section 22b of the runner portion 22 extends toward the mold cavity 16 in a direction generally normal to the mold cavity 16 as shown in FIG. 1. The first section 22a of the runner portion 22 extends more or less parallel to the edge of the mold cavity 16, and so the first section 22a is somewhat perpendicular to the second section 22b. The first section 22a is open along its length to supply material to the gate portion 20 along its length. As shown in FIG. 2, the first sections 22a of the runner portion 22 fans or tapers outwardly as it extends toward the gate portion 20. Preferably, the runner portion 22 includes at least one, and preferably two, cold slugs 36 for trapping and storing any unmelted pieces of material passed through the runners.

Figure 3:
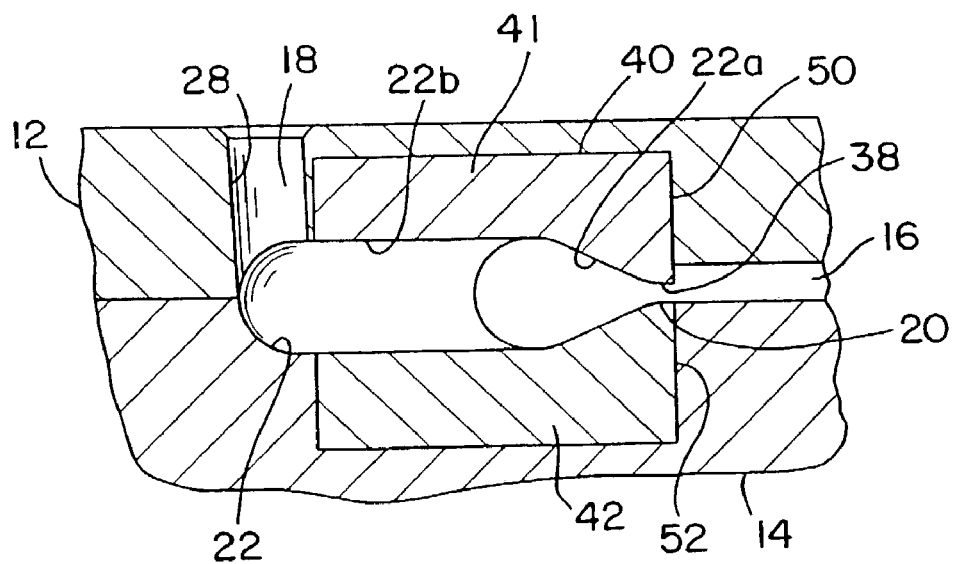
FIG. 3 is a side sectional view of a similar embodiment of the invention showing a mold and feed system taken along a vertical plane through the runner and gate.

The next element downstream of the runner portions is the gate portion 20. As stated, the gate portion 20 extends along a significant portion of the edge of the mold cavity 16. Thus, the gate portion 20 is sometimes referred to as an edge gate. As shown in FIG. 3, an orifice 38 is defined at the gate portion 20. In other words, the gate portion 20 is smaller or narrower in dimension than the first section 22a of the runner portion 22. The runner portion 22 tapers in dimension down to the gate portion 20. Experimentation with the Solvay Engineered Products' Engineered Polymers' Sequel 1440 grade of thermoplastic olefin (TPO) composition has an orifice 38 thickness between mold sections 12, 14 in the range of 0.010" to the nominal thickness of the product, more particularly from 0.010" to 0.060", and even more particularly preferred in the range of 0.030" to 0.050", and in any 0.001" increment therebetween. The length of the orifice 38 in relation to the thicknesses above preferably is in the range of 0.040" to the nominal length of the product, more particularly from 0.250" to 10.0", and even more particularly from 0.50" to 1.0", and in any 0.001" increment therebetween.

In operation, the mold sections 12, 14 close to define the mold cavity 16 and the feed system 18. Then, the operator causes a first molten plastic material, preferably a first thermoplastic composition, to flow into the feed system 18 into drop 28. The material travels through the drop 28 to the runner portion 22 and the runners conduct the material into the gate portion 20. The material from the runner portion 22 is initially impeded from flowing into the mold cavity 16 by the narrower dimension of the gate and begins merging and mixing upstream of the gate portion 20, and then continues to merge and mix in the gate portion 20 as it moves into the mold cavity 16 once the feed system along the gate is filled with material. Any unmelted pieces of material or other impurities in unmelted particle form will be trapped and retained in the cold slugs 36. Once the mold cavity 16 fills, the material can cool and harden. Then the mold sections 12, 14 can be separated and the molded article removed.

After the injection molding of product with the first plastic material is complete, the mold sections 12, 14 are separated and interchangeable members 41, 42 are removed from the recesses 50, 52 thereof. Thereupon, new interchangeable members, which correspond to an acceptable gate design for a second plastic material, are inserted into the recesses 50, 52 and fixed to mold sections 12, 14 in a similar manner to interchangeable members 41, 42. It should be understood that each plastic material may have its own interchangeable members to define its own gate design 40 as required to manufacture acceptable products. Once the new interchangeable members 41, 42 have been fixed within the recesses 50, 52 of mold sections 12, 14, the apparatus 10 is now ready for processing the second plastic material.

The invention has been described in an illustrative manner, and it is to be understood that the terminology which has been used is intended to be in the nature of words of description rather than of limitation.

Obviously, many modifications and variations of the present invention are possible in light of the above teachings. Therefore, it is to be understood that within the scope of the appended claims the invention may be practiced otherwise than as specifically described. Moreover, the reference numerals are merely for convenience and are not intended to be in any way limiting.

We claim:

1. A method for molding plastic articles having pigments used to modify light reflectivity, including the steps of:

providing a mold having a first mold section and a second mold section with a mold cavity disposed between the first and the second mold sections, said first and second mold sections each including a recess;

providing a first gate design mold member, said first gate design mold member including an orifice having dimensions, said first gate design mold member including two interchangeable members, one of said two interchangeable members located in the recess in said first mold section and the second of said two interchangeable members located in the recess in said second mold section;

providing a feed system including a runner portion in direct fluid communication with said interchangeable members; and forming a product in the mold cavity by providing a first plastic material including pigments used to modify light reflectivity through the first gate design mold member;

separating the first mold section and the second mold section;

removing the product from the mold cavity;

providing a second gate design mold member, said second gate design mold member including an orifice having dimensions; said second gate design mold member including two interchangeable members, one of said two interchangeable members located in the recess in said first mold section and the second of said two interchangeable members located in the recess in said second mold section, exchanging the first gate design mold member for the second gate design mold member;

forming a product in the mold cavity by providing a second plastic material through the second gate design mold member wherein said second gate design mold member orifice has dimensions different from the first gate design mold member orifice, and wherein the second plastic material includes at least one pigment that is different from said first plastic material.

2. The method for molding plastic articles of claim 1 wherein the mold comprises an injection mold.

3. The method for molding plastic articles of claim 1 wherein the first gate design mold member comprises an edge gate.

4. The method for molding plastic articles of claim 1 wherein the second gate design mold member comprises an edge gate.

5. The method for molding plastic articles of claim 1 wherein the first gate design mold member is removably attachable to the first or the second mold section by threaded fasteners.

6. The method for molding plastic articles of claim 1 wherein the second gate design mold member is removably attachable to the first or the second mold section by threaded fasteners.

* * * * *